United States Patent [19]
Angelis

[11] 4,291,424
[45] Sep. 29, 1981

[54] BEEHIVE

[76] Inventor: Jason Angelis, 5190 NW. 4 St., Miami, Fla. 33126

[21] Appl. No.: 131,750

[22] Filed: Mar. 19, 1980

[51] Int. Cl.³ .............................................. A01K 47/06
[52] U.S. Cl. ......................................................... 6/4 R
[58] Field of Search ........................... 6/4 R, 4 A, 4 B

[56] References Cited
U.S. PATENT DOCUMENTS

| | | | |
|---|---|---|---|
| 2,250,152 | 7/1941 | Clipp | 6/4 R |
| 3,343,186 | 9/1967 | Dunand | 6/4 R X |
| 4,007,504 | 2/1977 | West | 6/4 R |
| 4,135,265 | 1/1979 | de Kerkof | 6/1 |

FOREIGN PATENT DOCUMENTS 665868  7/1979  U.S.S.R. ................................. 6/4 R

Primary Examiner—Gene Mancene
Assistant Examiner—Robert P. Swiatek
Attorney, Agent, or Firm—John Cyril Malloy

[57] ABSTRACT

An improved beehive including a dome-shaped upper portion and a lower support portion with a mouth and a pathway leading into the dome-shaped structure with the pathway having a roof and a floor, the roof being of a first predetermined mesh sized to permit passage of worker bees and the lower portion being of a finer or smaller mesh so that worker bees cannot pass into a collection zone preferably a drawer-type collection box.

5 Claims, 7 Drawing Figures

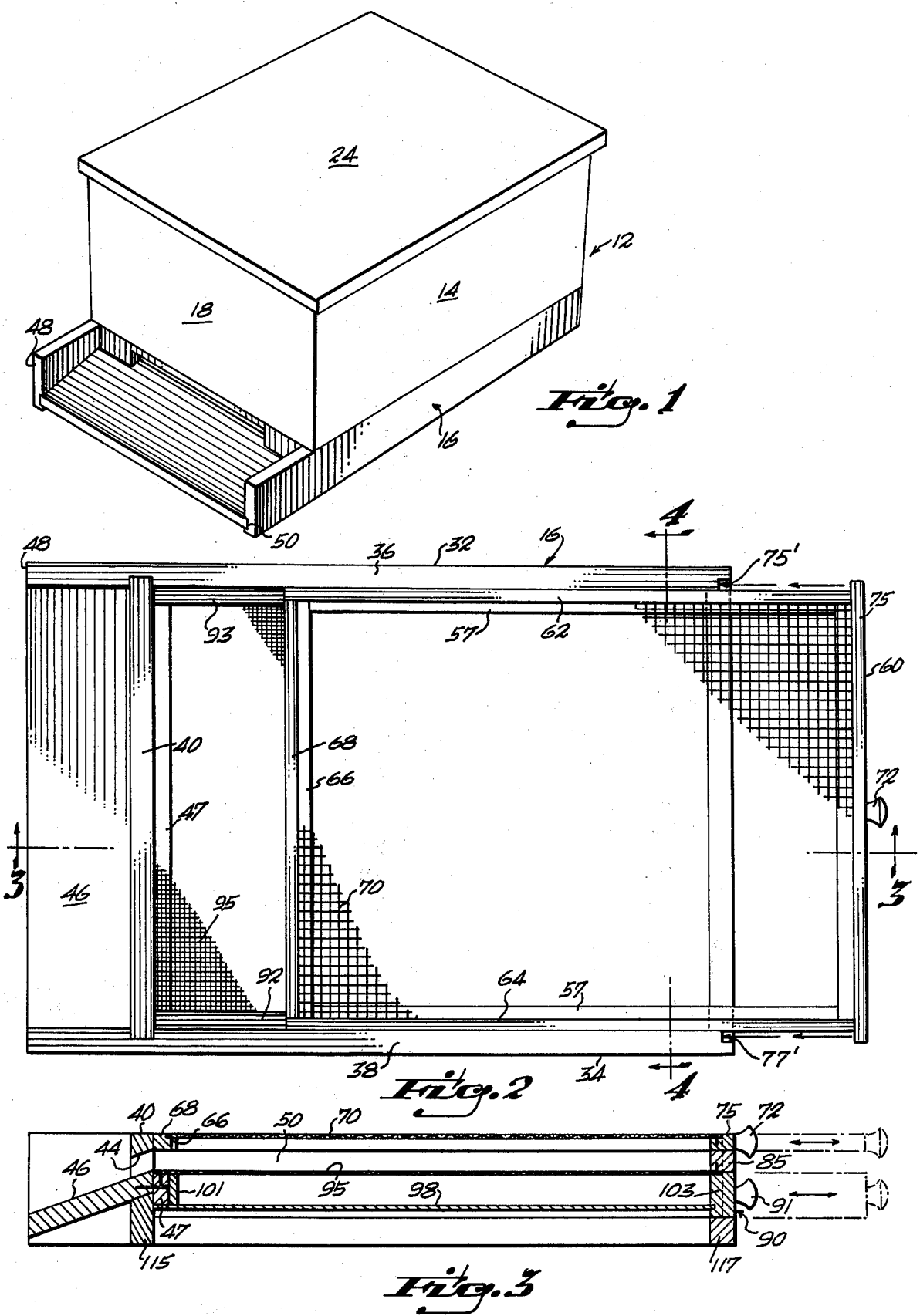

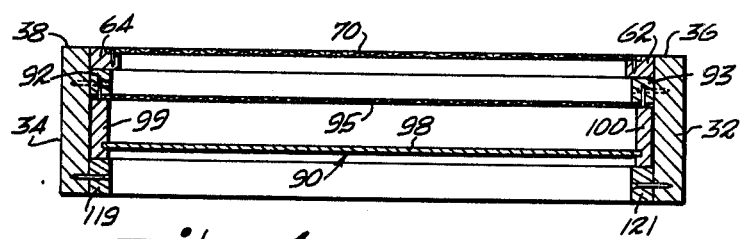
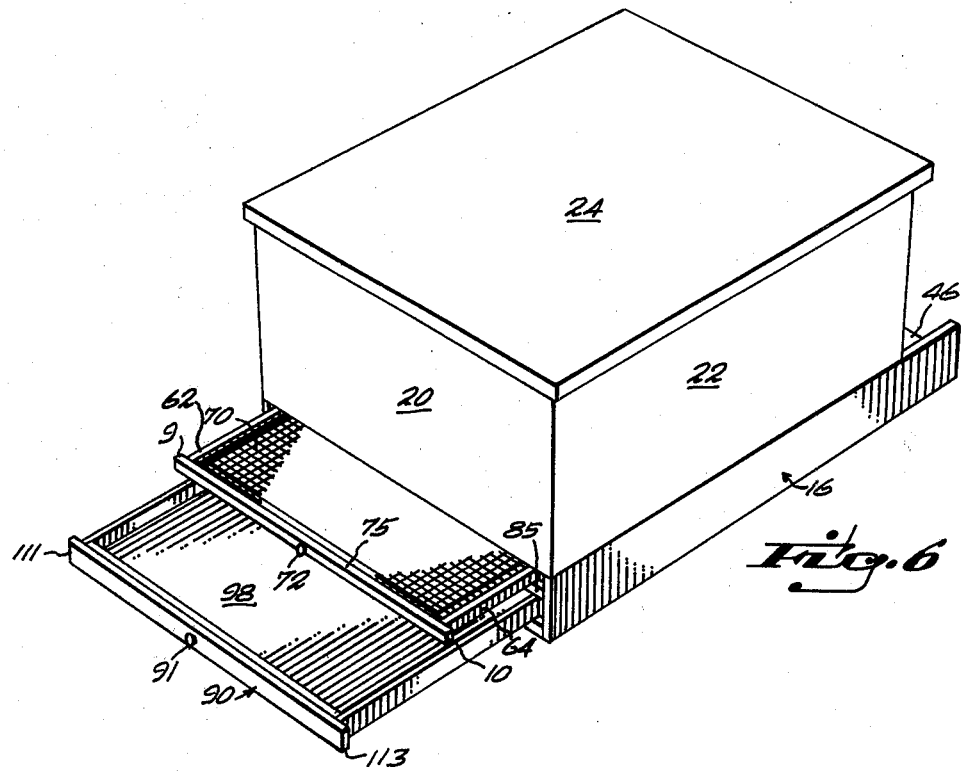
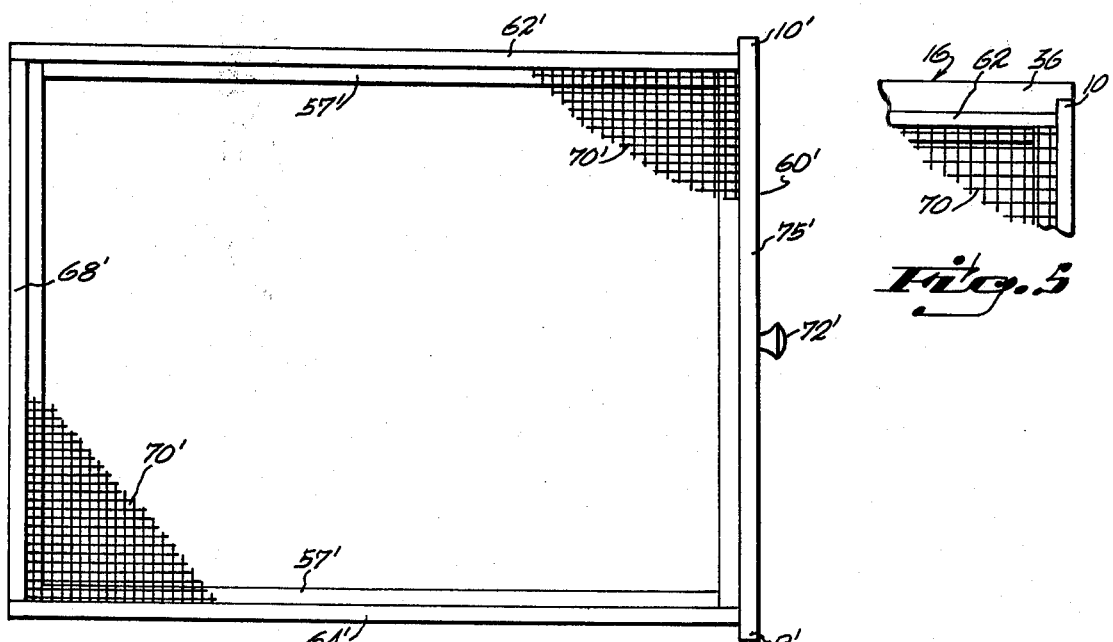

BEEHIVE

FIELD OF THE INVENTION

This invention relates to beehives.

BACKGROUND OF THE INVENTION

This invention has as an object the provision of a beehive composed of inexpensive material and an upper portion in dome form sized for mating engagement and support upon a lower portion and in which upper portion a queen bee is provided and in the lower portion there is an entrance mouth through which worker bees can take pollen to the queen bee in the upper portion but only upon passage through a screen which is sized for close passage of the worker bees into the dome structure so that pollen is scraped from them and falls through a fixed screen separating the lower porton into an upper chamber and a lower chamber, the upper chamber being part of the pathway to the queen bee and the lower chamber comprising a collection chamber into which the worker bee cannot enter because the screen which is fixed is of smaller mesh than will permit passage of the worker bees so that the collection drawer may be removed with the pollen on it from time to time which is collected as it falls from the worker bees legs.

It is another object of this invention to provide a beehive which provides for increased collection of pollen.

It is a general object of this invention to provide a device of the type described which is simple and inexpensive to manufacture and is otherwise well adapted for the purpose for which it is intended.

DESCRIPTION OF THE DRAWINGS

FIG. 1 is a perspective view of the improved beehive;

FIG. 2 is a top plan view of that portion of FIG. 1 designated by the arrowed line 16;

FIG. 3 is a view in cross-section taken on the plane indicated by the line 3—3 of FIG. 2 and looking in the direction of the arrow;

FIG. 4 is a view taken on the plane indicated by the line 4—4 of FIG. 2 and looking in the direction of the arrow;

FIG. 5 is a partial plan view of the upper drawer within the beehive, and seen in FIG. 6, as well as FIG. 2 and 3;

FIG. 6 is a perspective view illustrating the rear of the beehive, shown in a front perspective view in FIG. 1;

FIG. 7 is a plan view of the upper drawer structure shown in FIG. 5 and 6.

DESCRIPTION OF THE PREFERRED EMBODIMENT

Referring to the drawings wherein like reference characters designate like or corresponding parts throughout the several views and referring particularly to FIG. 1, there is shown a beehive which includes an upper portion generally designated by the numeral 12 and a lower portion generally designated by the numeral 16. The upper portion is a generally dome-shaped structure having spaced side walls such as 14 and 18 and a top surface 24. It is sized to rest upon and be supported by a lower portion now to be described. The lower portion includes spaced side walls 48 and 50, a front wall 40 and a rear wall 85. The upper surfaces 36 and 38 support the sidewalls 14 of the dome-shaped covering structure while the front and rear walls 40 and 85 of the lower portion support the front and rear walls 18 of the dome-shaped structure.

The front and rear and side walls of the lower portion, see FIGS. 2 and 3, are spanned by a screen structure composed of a frame of members 68, 75, 62 and 64 spanned by the screen 70 and which is slidable on runners 92 and 93 as a drawer upon manipulation of the operator 72 into a position where the frame member 68 is in abutting relation with the front wall 40 and is supported by the top surface of the lower portion rear wall 85, see FIG. 6. This accommodates sliding movement in and out and adapts the frame to be closed by the front 75 with the surface 60 being flush with the face of the rear by reason of the recesses provided 75' and 77' in the side walls 48 and 50 and seen in FIG. 2, for example. The frame is stepped slightly as at 57, see FIG. 3, to provide a bearing surface for the periphery of the screen.

A second screen structure 90 is provided. This screen structure is also in the form of a drawer generally designated by the numeral 90 in FIG. 6 as will now be explained. It is composed of a front and rear frame member as well as side frame members 99 and 100 and spanned by the screen 95. The screen 95 is of a smaller mesh than the screen of the upper drawer for a purpose to be explained. The lower drawer 90 is slidable as indicated in the drawing into abutting relation, in the closed position, with the rear frame member 101 in abutting engagement with an abutment member 47 fixed as by the nail shown in the drawings to the lower portion 115 of the front wall 40 and with the screen 95 being coplanar with the terminus of a ramp 46 which leads to the opening 44 in the front wall 40. Beneath the drawer, lower portion includes the supports 117, 119 and 121 for the lower drawer 90 which has a floor 98 beneath the screen roof 95 and a knob 91 for sliding movement of it into and out of stacked relation with the upper portion, the upper screen structure and the lower screen structure. In use, when a queen bee is within the dome-shaped upper portion of the beehive, worker bees will enter through the entrance 44 moving into the chamber 50. To return to the queen bee they will move upwardly through the screen 70, the one of larger mesh, and in so doing some of the pollen will be scraped from their legs falling to and through the screen 95 to be trapped in the lower drawer 90, where it is collected. The worker bee noting that this has occurred and desiring to take the pollen to the queen bee will return to the level of the floor of the chamber 50; however, the pollen will fall through and, since the screen 95 is smaller than he can negotiate, he is not able to enter into the lower drawer and recover the pollen. After the process has taken place a sufficient length of time, from the rear of the beehive, the upper drawer is removed and shaken to remove any pollen on it and replaced. Thereafter, the lower drawer 91 is removed in which the pollen will be collected. This lower drawer is moved slidably, see FIG. 4, beneath the screen 95 which is attached to the lower side of the runners 92 and 93.

It is thus seen that there is provided a simple and economical construction for use in providing a beehive.

What is claimed is:

1. A beehive comprising an upper closed dome structure having a downwardly facing opening; a lower portion including spaced side walls, a front wall and a rear wall and said lower portion being sized to close the opening of said dome structure and to matingly support said upper portion; said lower portion further comprising, a first screen structure of a first predetermined common size spanning the walls and separating the lower portion into an upper chamber and a lower chamber, said first screen structure being in a fixed position; a second screen structure of a second predetermined common mesh greater than the mesh of said first screen structure, said second screen structure comprising a first drawer sized for slidable drawer-type engagement in the lower portion, said lower portion including runners for said second screen structure, said front wall having a beehive entrance mouth in open communication with the upper chamber, said lower chamber beneath said first screen structure including a second drawer with a floor spaced vertically beneath said first screen structure for collecting pollen thereon and said lower portion including access means to gain access to the lower chamber for removal of collected pollen on the floor.

2. The device as set forth in claim 1 wherein the rear wall is provided with a first drawer slit in the upper chamber and said side walls include opposing first drawer guide tracks extending along the side walls from the rear wall horizontally in the upper chamber, and said second screen structure includes a peripheral frame for said first drawer, said first drawer being sized for slidable movement along the guide tracks for removal from the hive; and said frame including an end wall sized to close the first drawer rear wall slit.

3. The device as set forth in claim 1 wherein the access means is in the rear wall in the form of a drawer slit opening into the lower chamber and guide tracks are provided along the side walls in the lower chamber.

4. The device as set forth in claim 1 wherein an exterior entrance ramp is provided on the lower portion leading to said entrance mouth.

5. The device as set forth in claim 1 wherein the side walls of the said lower portion extend upwardly defining side walls and a ramp spans said side walls.

* * * * *

UNITED STATES PATENT AND TRADEMARK OFFICE
CERTIFICATE OF CORRECTION

PATENT NO. : 4,291,424
DATED : April 8, 1981
INVENTOR(S) : Jason Angelis

It is certified that error appears in the above—identified patent and that said Letters Patent is hereby corrected as shown below:

On The Title Page and Column 1, title of invention should read

-- POLLEN TRAP --.

Signed and Sealed this

Sixteenth Day of March 1982

[SEAL]

Attest:

Attesting Officer

GERALD J. MOSSINGHOFF

Commissioner of Patents and Trademarks